United States Patent
Van Phan et al.

(10) Patent No.: US 9,392,501 B2
(45) Date of Patent: Jul. 12, 2016

(54) FACILITATING GROUP HANDOVER

(71) Applicant: Nokia Solutions and Networks Oy, Espoo (FI)

(72) Inventors: Vinh Van Phan, Oulu (FI); Jian Feng Qiang, Beijing (CN); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/433,079

(22) PCT Filed: Oct. 4, 2012

(86) PCT No.: PCT/EP2012/069613
§ 371 (c)(1),
(2) Date: Apr. 2, 2015

(87) PCT Pub. No.: WO2014/053183
PCT Pub. Date: Apr. 10, 2014

(65) Prior Publication Data
US 2015/0245255 A1    Aug. 27, 2015

(51) Int. Cl.
*H04W 36/00* (2009.01)
*H04W 36/22* (2009.01)
*H04W 36/32* (2009.01)
*H04W 84/00* (2009.01)
*H04W 88/08* (2009.01)

(52) U.S. Cl.
CPC ...... *H04W 36/0027* (2013.01); *H04W 36/0016* (2013.01); *H04W 36/0033* (2013.01); *H04W 36/0055* (2013.01); *H04W 36/22* (2013.01); *H04W 36/32* (2013.01); *H04W 84/005* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,490,452 B1 * | 12/2002 | Boscovic | H04W 36/30 455/436 |
| 2008/0267127 A1 | 10/2008 | Narasimha et al. | 370/331 |
| 2009/0088157 A1 | 4/2009 | Aaron | 455/436 |
| 2009/0219856 A1 * | 9/2009 | Richardson | H04W 72/044 370/328 |
| 2012/0302240 A1 * | 11/2012 | Tamaki | H04W 36/0016 455/436 |
| 2013/0039171 A1 * | 2/2013 | Gaal | H04W 16/14 370/228 |
| 2013/0223403 A1 * | 8/2013 | Chen | H04W 36/24 370/331 |
| 2014/0086208 A1 * | 3/2014 | Murray | H04W 36/0072 370/331 |

(Continued)

FOREIGN PATENT DOCUMENTS

EP    1 058 473 A1    12/2000
WO   WO 2009/155992 A1   12/2009

OTHER PUBLICATIONS

Akyildiz, Ian F., et al., "NeXt generation/dynamic spectrum access/cognitive radio wireless networks: A survey", © 2006 Elsevier B.V., 33 pgs.

*Primary Examiner* — Kimberly A Williams
(74) *Attorney, Agent, or Firm* — Harrington & Smith (57) ABSTRACT

There is provided a method, including acquiring, by a network node of a source cell, information that a handover of a plurality user terminals currently connected to the source cell is needed to a target cell; determining at least one attribute with respect to each of the plurality of user terminals; selecting at least some of the plurality of user terminals to form a group of user terminals such that the user terminals in the group share at least one common attribute; and indicating the at least one common attribute of the group to a target node of the target cell in a group handover request message.

19 Claims, 5 Drawing Sheets

(56) References Cited

U.S. PATENT DOCUMENTS

2015/0036509 A1* 2/2015 Lopes .................. H04W 16/10 370/241.1

2015/0181481 A1* 6/2015 Masini .............. H04W 36/0083 455/436

* cited by examiner

900 RECEIVING, BY A USER TERMINAL COMPRISED IN A GROUP WHICH IS TO BE HANDED OVER FROM A SOURCE CELL TO A TARGET CELL, AN INDICATION OF A TIMING ADVANCE WHICH IS TO BE APPLIED IN A COMMUNICATION WITH THE TARGET CELL

902 DETECTING THAT A SPECIFIC PART OF THE HANDOVER PROCESS RELATED TO ACQUIRING THE TIMING ADVANCE IS TO BE BYPASSED

FACILITATING GROUP HANDOVER

FIELD

The invention relates generally to mobile communication networks. More particularly, the invention relates to facilitating a group handover.

BACKGROUND

Occasionally it may be possible to apply available spectrum of another cell. While entering the new cell offering the available spectrum may be more flexible, the return to the original or to a neighboring cell may not be. This may be due to the new cell turning off or the new cell's available spectrum disappearing. Such situation may require fast and reliable handover of a group of user terminals.

BRIEF DESCRIPTION OF THE INVENTION

According to an aspect of the invention, there are provided methods as specified in claims 1, 7, and 16.

According to an aspect of the invention, there are provided an apparatus as specified in claim 17.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a network to which the embodiments are applicable to;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Traditional solutions to improve spectrum efficiency may not be sufficient to support the predicted data traffic in the future. Thus, operators, network and device manufacturers and other players in the field are considering the utilization of other license-free or even licensed frequency bands instead or along with the own current spectrum. Such possibly available additional spectrum may also be called a shared spectrum. From the cellular traffic point of view, an interesting shared spectrum band opportunity may be Industrial, Scientific and Medical (ISM) bands. The ISM bands are widely used for WLAN and Bluetooth® communication, for example. The ISM bands allow both standardized systems and proprietary solutions to be deployed onto spectrum as far as regulations are followed.

Figure 1:
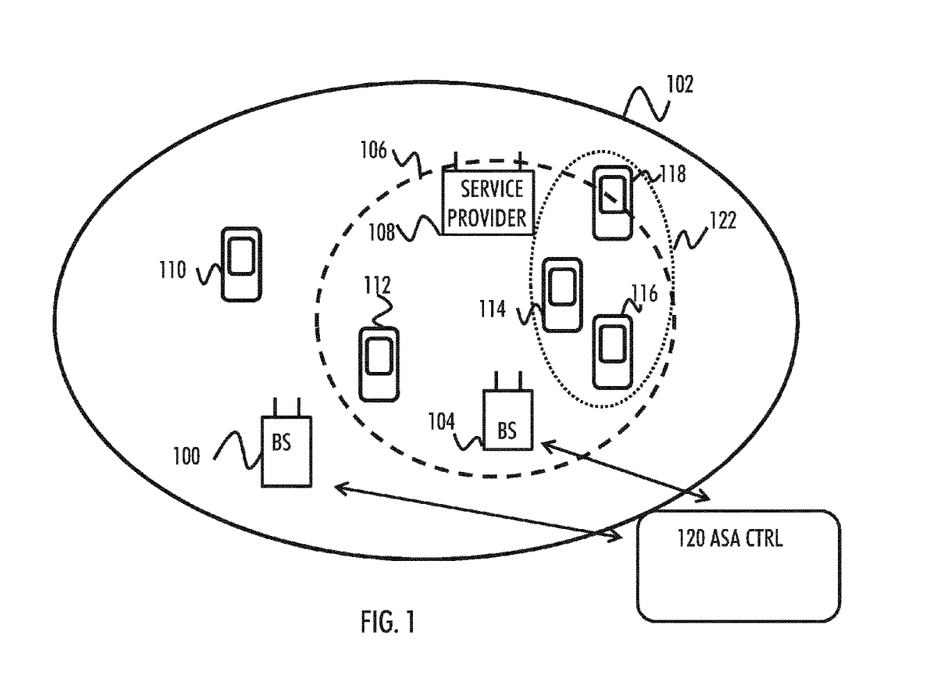

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio system, such as with at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A.

Typically the communication network comprises base stations 100, such as a node B (NB) or an evolved node B (eNB), capable of controlling radio communication and managing radio resources within a corresponding cell 102. Further, the eNB 100 may establish a connection with user terminals (UTs) 110 to 118, such as a mobile user equipment (UE) or any other apparatus capable of operating in a mobile communication network.

Let us further assume that there may be another cell 106 provided by a base station 104, which may be a Home eNB (HeNB), for example, as shown with a dashed circle 106. The second cell 106 may be at least partially overlapping with the first cell 102. Each of the UTs 110 to 118 may originally be camped on the cell 102, i.e. possibly communicating with the base station 100. However, let us further assume that the second cell 106 provides so called shared spectrum.

As such, it may be possible that some of the UEs advantageously exploit the radio communication capabilities of the second cell 106. Therefore, at least some of the UEs, such as the UEs 112 to 118, may be handed over to the cell 106 to utilise the shared spectrum which may be simultaneously used by another, incumbent user, such as the service provider 108 or some other apparatus utilizing the available spectrum. It should be noted that there may be a primary user system which has a priority access to the shared spectrum. For example, wireless local area network (WLAN) users may be seen as the primary users whereas the cellular users may be so called secondary users. The secondary user may not be allowed to impose severe interference to the primary users. Alternatively, no system is given a priority to the spectrum usage.

In order to avoid unnecessary interference to the incumbent users, an authorized shared access (ASA) is provided. The ASA is a complementary spectrum authorization scheme for commercial use that may enable timely availability of harmonized spectrum for mobile broadband while ensuring predictable QoS for all rights holders, such as the service provider 108. Accordingly, an ASA controller 120 may allow new users access the (already licensed) spectrum with the obligation to protect the incumbent user. As such, the primary users (incumbents) may share the ASA spectrum with one or several new incoming users or operators. In other words, incoming users may (exclusively) use the ASA spectrum band when and where no or only little primary service is scheduled on the band. The access may be performed via cognitive radio capabilities of the UEs 110 to 118, for example. The incumbent user may work on a primary basis maintaining its spectrum assignment. The ASA concept may utilize the recent advances in cognitive technology, thus allowing spectrum sharing in a more dynamic way including frequency-, location- and time-sharing basis.

However, even though the UEs 112 to 118 may be successfully handed over to the cell 106, there may be situations in which the previously available spectrum of the cell 106 disappears. This may require a fast "emergency" group handover or evacuation of the UEs 112 to 118 back to the previous cell 102 or to another cell in proximity. As such, a handover burst may be inevitable to neighboring cell(s) 102. Accordingly, it is to be noted that due to urgent nature of cell evacuation, the speed of massive HO execution of a plurality of UEs 112 to 118 from the ASA cell 106 to the overlapping or neighboring cells 102 is important in order to ensure service continuity of as many active UEs 114 to 118 as possible. Such scenario may even override the load balancing aspects between the cells 102 and 106. In this light, it is to be noted that the current load-balancing based handover may not be fast and effective enough to cope with the urgent need of such cell evacuation.

Figure 2:
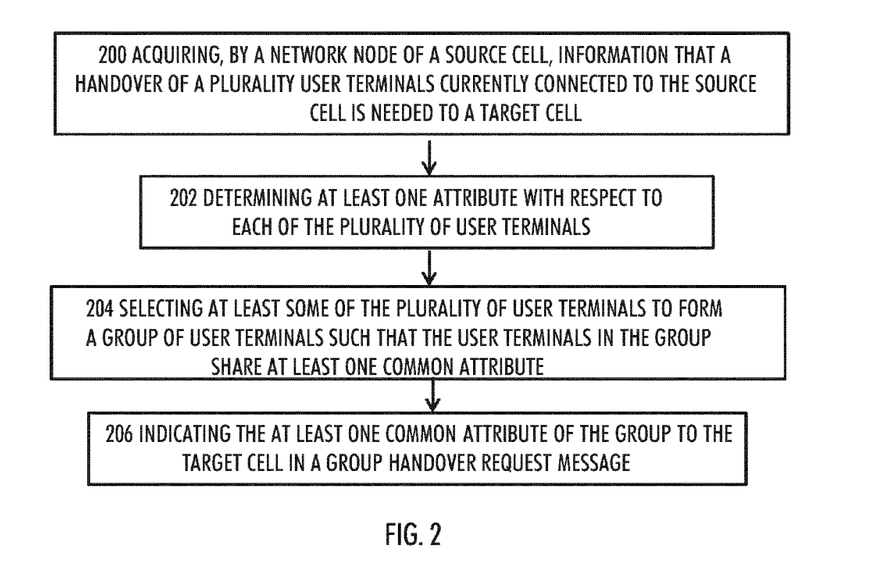
FIGS. 2, 3, 4, and 5 show methods, according to some embodiments.

Hence, it is proposed, as shown in FIG. 2, to acquire in step 200, by a network node 104 of a source cell 106, information that a handover (HO) of a plurality user terminals 112 to 118 currently connected to the source cell 106 is needed to a target cell 102. It should be noted that the source cell 106 may be a cell at least partly controlled by the ASA procedure. The detection of HO need may be due to the ASA controller 120 informing the eNB 104 that the available spectrum of the ASA cell 106 (i.e. the source cell) is to be used by a primary user or that the ASA cell 106 is to be switched off. Thus, the UEs 112 to 118, currently served by the ASA cell 106, may need to be handed over. The eNB 104 may also make such decision by itself without any input from the ASA controller 120, for example, by detecting that available radio resources are insufficient.

In step 202, the eNB 104 may determine at least one attribute with respect to each of the plurality of user terminals 112 to 118. These attributes may comprise at least one of the following: a target cell with respect to the UE, a priority class of the UE, a quality-of-service (QoS) parameters of the UE, a radio or reference bearer (RB) configuration(s) of the UE, physical attributes, such as timing advance information. The eNB 104 may be aware of the attribute value based on communication with the UE 112 to 118, or it may acquire the attribute directly from the UE 112 to 118, for example.

In step 204, the eNB 104 may select at least some of the plurality of user terminals 112 to 118 to form a group 122 of user terminals such that the user terminals in the group share at least one common attribute. Looking at FIG. 1, let us assume that the group 122 comprises UEs 114 to 118. The at least one common attribute may define that the user terminals in the group have at least one of the following: the same priority according to a predetermined criteria, QoS requirements of a pre-defined similarity, RB configurations of a predefined similarity, timing advances within a predefined interval, for example.

Thereafter, in step 206, the eNB 104 may indicate the at least one common attribute of the group 122 to the target cell 102 (more particularly, to the node 100 of the target cell 102) in a group handover request message. From the network point of view, the number of users 114 to 118 sharing the common attribute(s), such as the QoS requirements, may be handled together in a group 122 which is characterized with, e.g., the number of UEs 114 to 118 in the group 122. Thus, the proposal optimizes signaling due to the group based control over an X2 interface between the source and target nodes 104, 100, respectively. In this regard, all common attributes may be treated in a group-based control fashion. Each specific kind of common attribute may result in different signaling over the X2, such as transmission of information elements, or different HO procedures.

The group handover message may comprise also other information, such as the number of UEs 114 to 118 in the group. For example, the group HO request may include information elements for the number of UEs in the group 122 (in this case three), the common attributes, such as same QoS requirements and RB configurations applied for all UEs 114 to 118 in the group 122 (which may be omitted if of best-effort class). If those UEs 114 to 118 are all of voice-call or RT service UEs, then the RB bearer configuration may specify a requested guaranteed bit rate (GBR), and so forth. Further, the request may be accompanied with another request for an individual handover of the UE 112, for example.

Thus, the massive group HO request message from the source eNB 104 to a target eNB 100 may include a HO request for individual UE, such as the UE 112, in a regular fashion and advantageously a HO request for an individual group 122. This may be advantageous as the proposed fast group HO scheme of massive amount of UEs may allow that the handover of higher priority or more complex UEs (those which have many RB services, for example) may be treated more individually and those of lower priority or simpler UEs (for example those which have a single best-effort RB service) may be treated more loosely together in a group which share certain common attribute(s).

Figure 3:
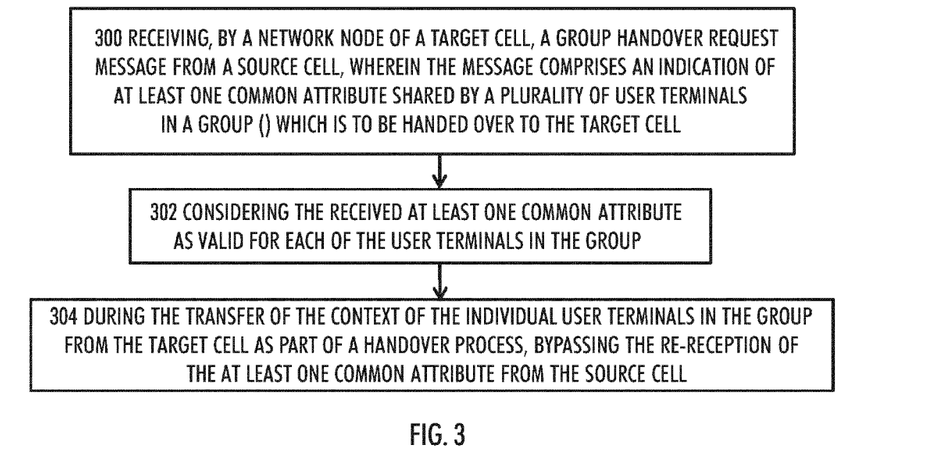

Looking from the target cell's 102 point of view, as shown in FIG. 3, the eNB 100 of the target cell 102 may receive in step 300 a group HO request message from the source cell 106 (and more particularly from the eNB 104), wherein the message comprises the indication of the at least one common attribute shared by a plurality of user terminals 114 to 118 in the group 122 which is to be handed over to the target cell 102. Thereafter, in step 302, the eNB 100 may decide to consider the received at least one common attribute as valid for each of the user terminals 114 to 118 in the group. Thus, the eNB 100 obtains knowledge that the UEs 114 to 118 all share the same common attribute, i.e. the value of the attribute is substantially the same with all the UEs 114 to 118 in the group 122.

As part of the handover process, the target node 100 and the source node 104 may perform the transfer of the UE contexts. This is typically performed individually for each of the UEs 112 to 118 requiring to be handed over. However, as the target node 100 may have already in the request message acquired some knowledge of the attributes with respect to the group members 114 to 118, the node 100 may, during the transfer of the context of the individual user terminals 114 to 118 in the group 122, bypass the re-reception of the at least one common attribute from the source node 104 in step 304. Similarly, the source eNB 104 may bypass the retransmission of the at least one common attribute to the target cell 102 during the transfer of the UE context. As a result, in the HO process of the UE group 122, the at least one common attribute of the group 122 is indicated once, e.g., by using some group-wise common information element part in the group HO request message. In particular, the common attribute(s) is/are not repeated for each and every individual UE when transferring the UE contexts. This may advantageously reduce the signaling overhead on the X2 interface between the eNBs 100 and 104. For the individual HO of the UE 112 however, the UE context may need to be transferred in full. This may be because the HO request message may not indicate any attribute for the UEs which are not in the group 122.

Figure 4:
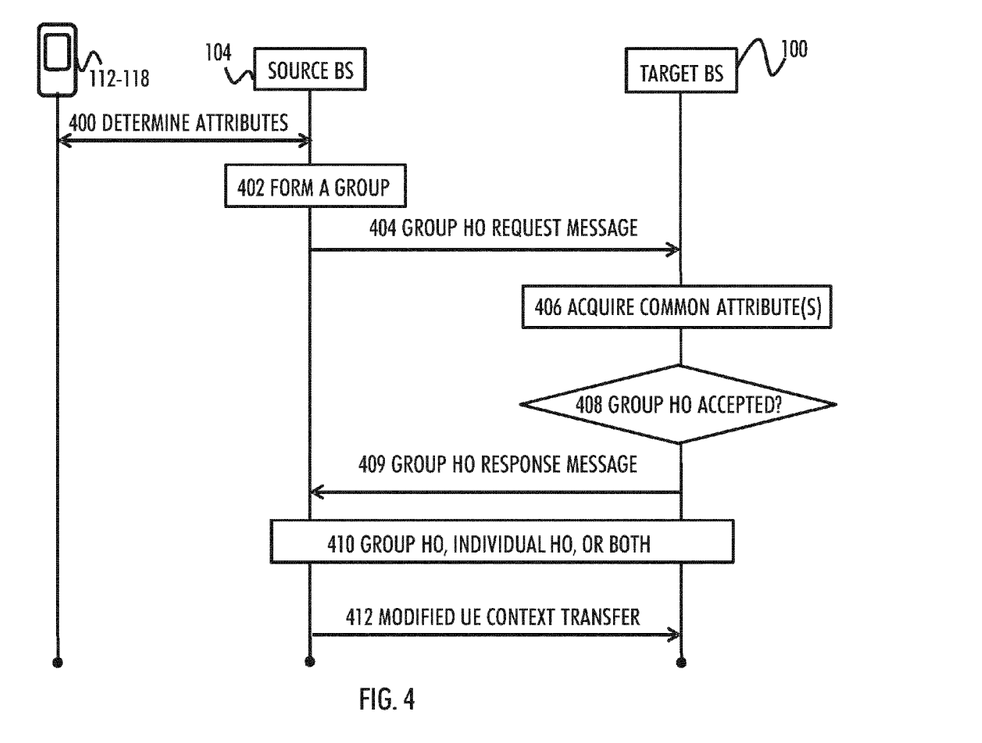

Let us take a look at the proposed scenario by referring to a signaling flow diagram between the source and target eNBs 104 and 100, respectively, as shown in FIG. 4. In step 400, the source node (BS, eNB) 104 determines the at least one attribute with respect to each user terminal 112 to 118, which is to be handed over to the target cell 102. In step 402, the source eNB 104 forms the group 122 by selecting those UEs 114 to 118 which share at least one common attribute (such as substantially the same QoS parameters, for example). Then the eNB 104 may send a group HO message to the target eNB 100 in step 404. Note that the source node 104 may additionally send individual (typical) HO request with respect to the UE 112, which is an UE in the need of handover but not a member of the formed group 122 (as it may not share the common attribute).

Thereafter, in step 406, the target BS 100 obtains knowledge of the common attribute shared by each group member 114 to 118. Now, as the target node (BS, eNB) 100 knows how many UEs 112 to 118 are to be handed over, the target BS 100 may decide is the group HO accepted in step 408. Factors affecting this decision may comprise, for example, the capacity of the target cell 102, current traffic load of the target cell 102, whether or not the target eNB 100 is capable to handle group HO, to mention only a few. The eNB 100 may decide to perform the group HO, an individual HO, or both.

Let us now assume that the group HO is possible. In response to the group HO Request, the target eNB 100 may first transmit a group HO response/acknowledgment message to the source eNB 104 in step 409. The response message may comprise group specific control information to be distributed by the source node 104 to the user terminals 114 to 118 in the group 122. The target cell 100 may in this way, e.g., configure the UE group 122 which is to be handed over. The group specific control information may include, for example, UE identification related data, RB configurations, timing advances (TA) to be used by the group 122, whether the HO is accepted or not, etc. In an embodiment, the common control signaling may be related to the received common attribute which is shared by the group members. The source eNB 104 may then indicate the decision to the user terminals 114 to 118 in the group 122. This may take place as a common control signaling (e.g. multicasting) or as a dedicated signaling. Thus, advantageously the source eNB 104 and/or the target cell eNB 100 may utilize the common control signaling over the X2 interface in order to reduce the signaling overhead. Thereafter, in step 410, the handover takes place between the eNBs 104 and 100. The HO may be a group handover of user terminals 114 to 118, an individual handover of the UE 112, or both.

As one part of a handover, the proposal comprises then the transmission of the individual UE context in step 412 to the target BS 100 from the source BS 104. However, here a modified UE context exchange may be applied. Accordingly, the at least one common attribute among the group members 114 to 118 (which is already known by the target node 100) is not transmitted again to the target node 100. This may reduce the signaling overhead and time consumed for the group HO. It should be noted that, in one embodiment, the step 412 may be comprised/embedded already in the step 404. In other words, the UEs' context may be transferred in the group HO request message or at the same time as the group HO request message. However, even then the modified UE context exchange may be applied (e.g. transmitting the at least one common attribute only once as a common attribute). Similarly, the information elements common to all the UEs in the group 122 with respect to the group HO response message may be indicated only once to the source eNB 104.

In an embodiment, a UE context release message from the target eNB 100 to the source eNB 104, which may end the HO process, may be on a group basis. E.g., in an embodiment, upon successfully performing the group handover, the target eNB 100 may transmit a group specific message indicating that the source eNB 104 is to release the contexts of all the UEs 114 to 118 in the group 122. E.g. a single information element indicating the release may be possible, instead of transmitting such context release message with respect to each and every UE 114 to 118 individually. In an embodiment, the UE context release message may be omitted in those cell evacuation scenarios in which the cell 106 is switched off and, thus, all UE contexts will be released anyways.

Figure 5:
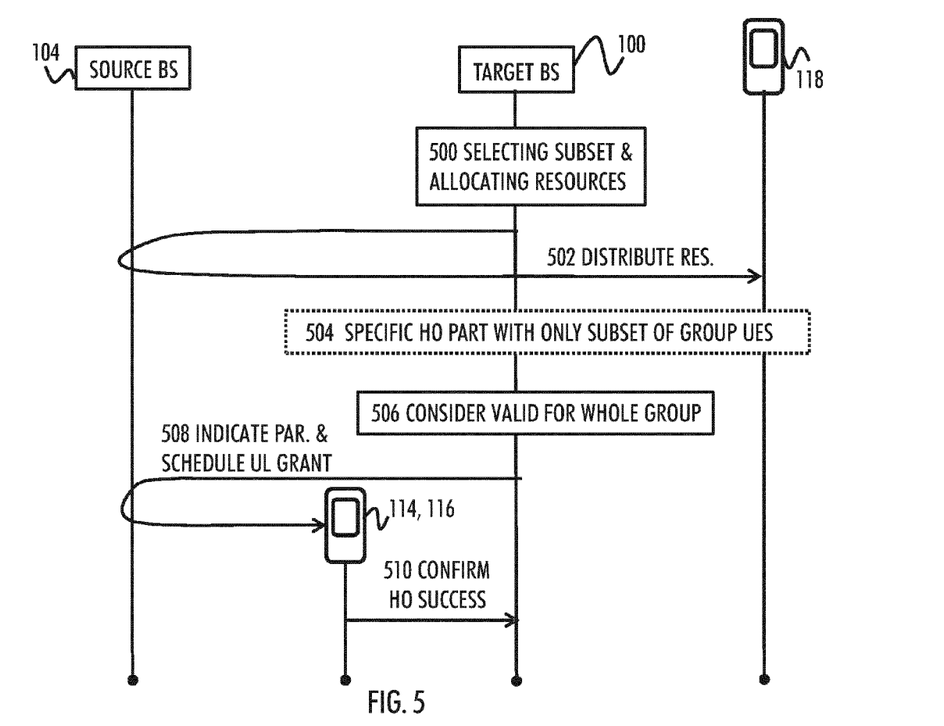
Figure 6:
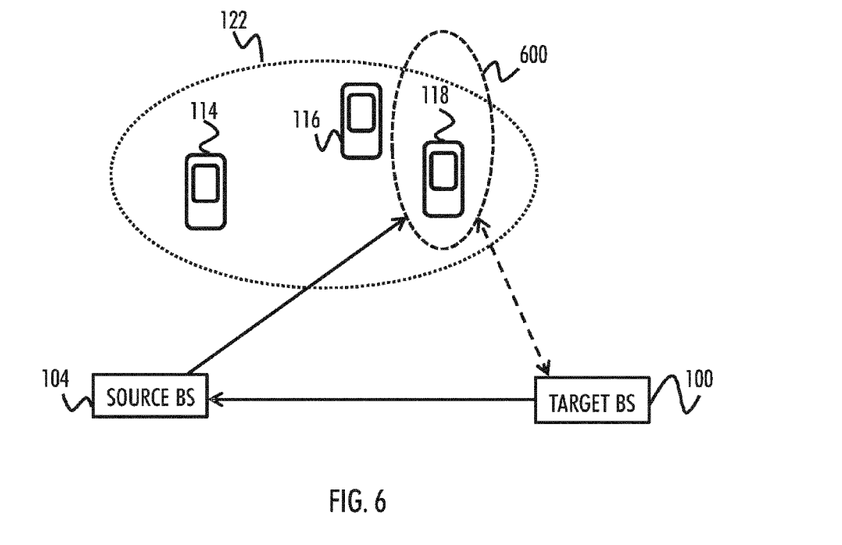
FIG. 6 show a subset, according to an embodiment.

Let us now take a look at FIGS. 5, 6 which show some example parts of the group HO process. FIG. 6 shows that the group 122 comprises UEs 114 to 118. Let us assume that they share the at least one attribute, i.e. the attribute or the value of the attribute is substantially the same with each and every UE 114 to 118 in the group 122. Let us further assume that shared attribute define that the UEs 114 to 118 have the timing advances within a predefined interval (i.e. they do not have to be exactly the same, but approximately the same) with respect to the source BS 104. It may be that the group HO request has comprised an indication flag indicating whether all the relevant UEs 114 to 118, regardless of priority, in the group 122 have the same timing advance information towards the current source BS 104 or not (i.e. a timing advance indication flag). Further, it may be expected that those UEs 114 to 118 which have substantially the same TA information towards the current source node 104 and to be handed over to the same target cell 102, may also have substantially the same timing advance information towards the target cell BS 100 as well. Such detection may be taken into use for the HO process as will now be explained. Although the following is written with an assumption that the TA is the common attribute shared in the group 122, the process may be applied for other attributes as well.

The process shown in FIG. 5 may start by the target eNB 100, having obtained the knowledge of the group 122 and of the shared attribute (i.e. the TA information), selecting in step 500 a subset 600 of the group 122. The subset may comprise at least one UE but, as the term "subset" indicates, not all the UEs 114 to 118 of the group 122. In the case of FIG. 6, the subset 600 comprises only the UE 118. The subset 600 may be selected randomly among the UEs 114 to 118 of the group 122, or based on a predetermined rule, for example.

Further in step 500, the target eNB 100 may allocate resources to the subset 600 of the group 122, wherein the allocated resources are to be used by the subset 600 in representing the whole group 122 during a specific part of the handover process. The eNB 100 may also indicate the allocated resources to the source eNB 104 for distribution. Thus, the target cell eNB 100 may indicate a corresponding indication flag along with certain group 122 ID assigned together with limited dedicated UL resources for certain assigned UE(s) 118 (i.e. the subset 600) having certain radio network temporary identifier(s) (RNTI) or just in blind fashion.

Consequently, the source eNB 104 may, after receiving an indication of the allocated resources from the target eNB 100, distribute in step 502 the allocated resources to the subset 600. The resources may be uplink resources from the subset 600 to the target eNB 100. The source eNB 104 may also notify the individual UE 118 (i.e. the subset 600) that it is to carry out the specific part of the HO process and notify the other UEs 114, 116 that they are to try bypassing the specific HO process part upon handing-over to the target cell 102.

As said, in an embodiment, the common shared attribute is the TA information defining that all the UEs have TAs with respect to the source cell 102 within a predetermined interval. In such case the allocated resources may refer to resources for an uplink physical random access channel (PRACH) and the specific part of the handover process comprises an uplink random access (UL RACH) procedure. The uplink random access procedure is typically applied by UEs in acquiring TA towards the target cell 102.

The target eNB 100 may perform the specific part, such as the UL RACH process, only with the subset 600 in step 504. The subset 600 may advantageously represent the whole group 122 for this specific part of the handover. The target cell eNB 100 may determine at least one parameter value related to the shared attribute in the specific part of the handover process, wherein the determined at least one parameter value is to be applied in communication between the target eNB 100 and the subset 600. Such parameter value may be the TA information with respect to the target eNB 100.

Further, in step 506, the eNB 100 may consider the determined at least one parameter value (such as the TA towards the target eNB 100) as valid also for the rest of the user terminals 114, 116 in the group 122. In step 508, the target eNB 100 may indicate the determined parameter, such as the TA information with respect to the target cell 102, to the other group members 114 and 116. In other words, only one or few of the UEs within the group 122 may need to perform the regular RACH procedure (e.g. using allocated dedicated RACH resources/preambles) to get the TA information. The rest of the UEs may get the same TA information (enabling synchronization and access in uplink) from the target cell eNB 100 as soon as the first UE(s) 118 have been handed over, thus advantageously bypassing the UL RACH procedure. Thus, those UEs 114, 116 and the target node 100 may skip sending and receiving the RACH preambles.

The target cell eNB 100 may indicate the TA information to the UEs 114 and 116 either directly or via the source eNB 104 to which the UEs 114 and 116 may still be connected to. Performing the specific part of the handover process, such as the UL RACH process, with only the subset 600, instead of each and every UE 114 to 118 in the group 122, may help to reduce overhead and fasten UE access in target cell 102 and therefore enhance the cell evacuation scenario, and resolve the problem of limited RACH resources in the target cell 102. This may be because the target cell 102 may need to allocate only one or few dedicated RACH preamble(s) on the basis of the group HO request.

However, the UEs 114 and 116 bypassing the UL RACH procedure may still need to send some initial indication or acknowledgement in UL to the target eNB 100 to confirm the HO success in step 510. It should be noted that in regular operation the first UL grant in the RACH process response from the target eNB 100 may be seen as an acknowledgement to the UE being handed over. In an embodiment, in step 508 of FIG. 5, the target eNB 100 may schedule an UL grant to those UEs 114 and 116 which have not performed the specific part of the handover process. The grant may be sent to the UEs 114, 116 directly or via the source eNB 104. The UEs 114, 116 receiving the grant may transmit some information to the target cell eNB 104. Upon receiving a transmission of information from an UE 114 and/or 116, the eNB 100 may consider the HO for that certain UE as successful. In this way, the individual UEs 114, 116, which received the TA information from the target eNB 100 without having to send an UL RACH preamble in the HO process, may get first UL grant to send some confirmation to the target eNB 100 in step 510. For an example, the target eNB 100 when sending the predictive TA information to new UEs 114 to 116 may also schedule the first UL transmission for those individual UEs 114 to 116 to confirm the HO. However, those UEs 114, 116 may already have identifiers assigned and therefore a RRC connection request may not be needed. Instead, something else may be sent by the UEs 114, 116, such as a HO success confirmation message. Other information may be sent as well to indicate the HO success, such as a scheduling request, a channel quality indicator (CQI) report, or a L2 report. If such confirmation message is not received and acknowledged correctly by the target eNB 100 for an individual UE 114 and/or 116, then that UE 114 and/or 116 may be required to perform the typical UL RACH procedure.

As an alternative or additional procedure to the TA determination, in an embodiment, the target eNB 100 may detect that according to the at least one common attribute the user terminals 114 to 118 in the group 122 have, for example, QoS requirements of a predefined similarity. The target eNB 100 may then determine at least one communication parameter to meet the required QoS in the specific part of the handover process with the subset 600, wherein the determined parameter(s) is to be applied in communication between the target eNB 100 and the subset 600. Then the eNB 100 may consider the determined communication parameter(s) as valid also for the rest of the user terminals 114, 116 in the group 122.

Figure 7:
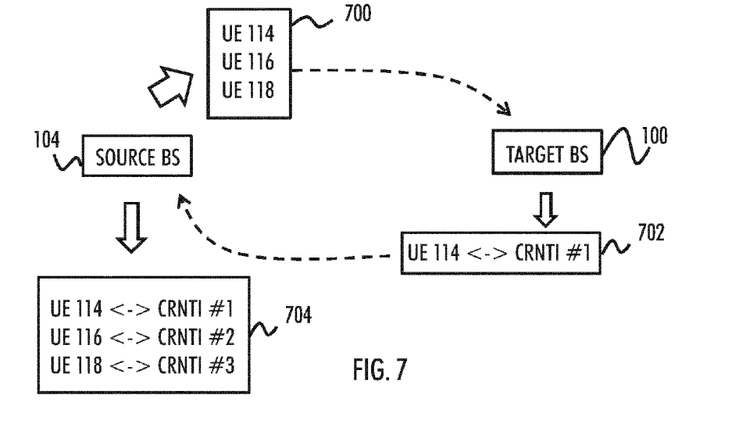
FIG. 7 illustrate some embodiments related to identification of the user terminal in a group.

FIG. 7 shows an advantageous way of preserving a list of the UEs 114 to 118 in the group 122. In this embodiment, the source eNB 104 may arrange the UEs in the group 122 to a list 700. Then the source eNB 104 may indicate the order of the list 700 to the target eNB 100, as shown with the dashed arrow. However, instead of dropping the memory element(s) carrying the information of the list 700, the order of list 700 may beneficially be preserved in the memory of the source eNB 104 and may thus be used for identifying and/or mapping relevant UEs 114 to 118 between the source eNB 104 and target eNB 100. This may help to make the group HO request shorter and easier to handle, and may make it easier for the target eNB 100 to make and inform the decision regarding the group HO request.

Further, in an embodiment, the target cell eNB 100 may assign group identification (ID) to the group 122. The target eNB 100 may also assign a temporary ID, such as RNTI or cellular RNTI, to each of the user terminals 114 to 118 in the group 122 on the basis of a predetermined rule. The rule may define that the designated set of IDs form, in an embodiment, a continuous set of IDs. However, instead of indicating all the designed IDs of the UEs 114 to 118, the target cell eNB 100 may indicate only one, or a subset, of the assigned temporary IDs corresponding to one, or a subset, of the user terminals 114 to the source eNB 104, as shown with the dashed arrow and the block having a reference numeral 702 in FIG. 7. The signaled ID may be the first or starting RNTI with or without the total number of RNTIs. The signaling of the ID may take place when transmitting the group HO acknowledgement to the source eNB 104.

The source eNB 104 may then derive the temporary IDs for the rest of the user terminals 116 and 118 in the group 122 on the basis of the indicated temporary ID, as shown with the block 704 in FIG. 7. This may be possible because the source eNB 104 may know the predetermined rule (such as the continuous set of IDs) and allocate consecutive IDs to the consecutive UEs in the group 122 starting from the indicated ID #1 to the UE 114.

In an embodiment, some common RB configuration, dedicated RACH resources and/or physical downlink control channel (PDCCH) resources corresponding to certain UE IDs (such as the subset 600) may be included in the group HO response message. The source eNB 104 may then distribute the allocated resources and/or configurations of the target eNB 100 to the corresponding subset of UEs. Such distribution may advantageously utilize the preserved order of the UEs 114 to 118 in the list 700.

Figure 8:
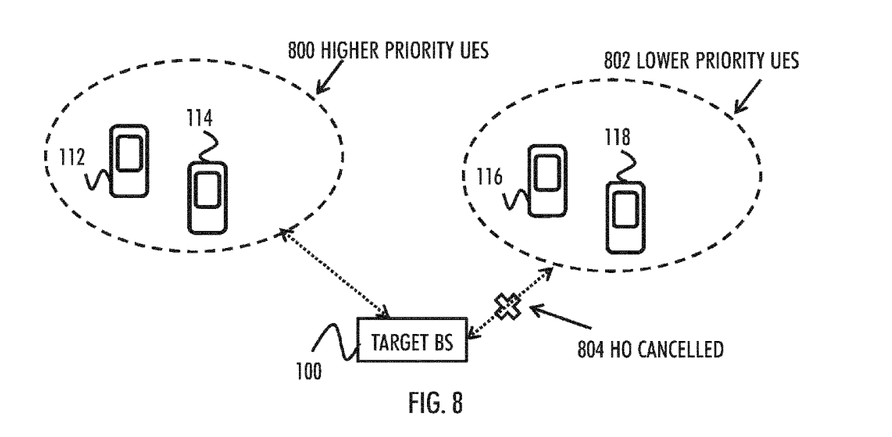
FIG. 8 depicts a scenario with different priorities of user terminals, according to an embodiment.

In an embodiment as shown in FIG. 8, the target cell 100 may detect that there are UEs, or groups of UEs, with different priorities among the user terminals 112 to 118 that are to be handed over to the target cell 102. In FIG. 8, there are two groups 800 and 802, each with two UEs 112, 114 and 116, 118, respectively. Let us further assume that the group members share the same priority, i.e. the common attribute indicated to the target eNB 100 in two the group HO messages is the priority. The priority may depend on the amount of radio bearers applied by the corresponding UE, for example. The priority of the UE may be classified according to predefined levels, for example. The level of the priority shared by all the group members may be then indicated to the target cell eNB 100 as the at least one common attribute. However, as shown in FIG. 8, the group 800 comprises higher priority UEs whereas the group 802 comprises lower priority UEs. The target eNB 100 may detect that all of the user terminals 112 to 118 cannot be handed over to the target cell 102. Such detection may be based on the cell 102 capacity, for example. As a consequence, the target eNB 100 may then decide to handover only those user terminals 112, 114, or the group 800, which have a higher priority. I.e. the UEs 116, 118, or the group 802, with the lower priority may not be handed over, at least not at this point of time, as shown with the cross 804. As such, the group HO request of the source eNB 104 may be rejected in part, resulting in some HO failures. Hence, the group HO request response/acknowledgement may also include an implicit or an explicit HO preparation failure regarding certain requested UE(s) or group 902 of UE(s).

Figure 9:
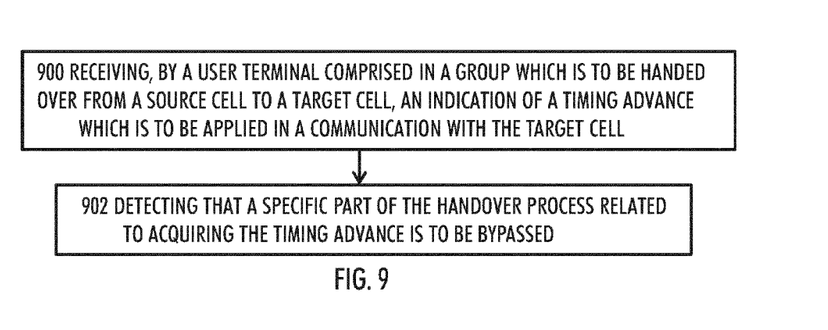
FIG. 9 illustrate a method, according to an embodiment.

From a point of view of an individual UE in a group 122 which is to be handed over from a source cell 106 to a target cell 102, the proposed solution may comprise, as shown in FIG. 9, receiving in step 900 an indication of a TA which is to be applied in a communication with the target eNB 100. From the reception of the TA and/or from a corresponding indication from the source eNB 104, the UE may detect in step 902 that a specific part of the handover process (such as the RACH process) related to acquiring the TA is to be bypassed. Thus, the HO of the corresponding UE may be expedited without compromising the reliability of the HO.

It is to be noted that the scheme proposed herein may be applied for any situations which have some urgent needs of cell evacuation, such as on-the-fly cell switching-off for energy-saving or performance optimization, site-failure recovery, etc.

Figure 10:
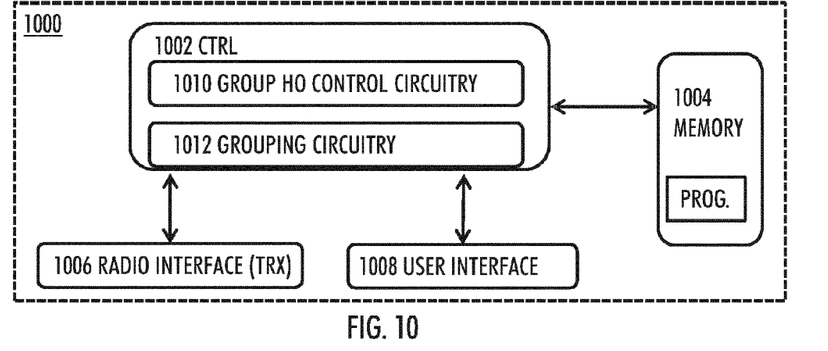
FIGS. 10 to 12 show apparatuses, according to some embodiments.
Figure 11:
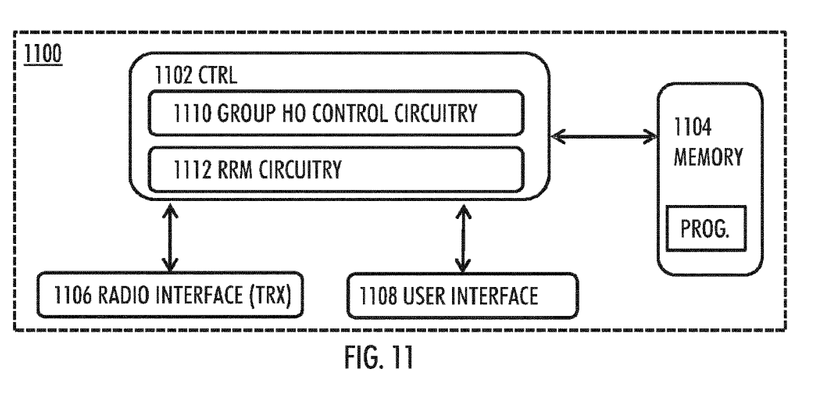
Figure 12:
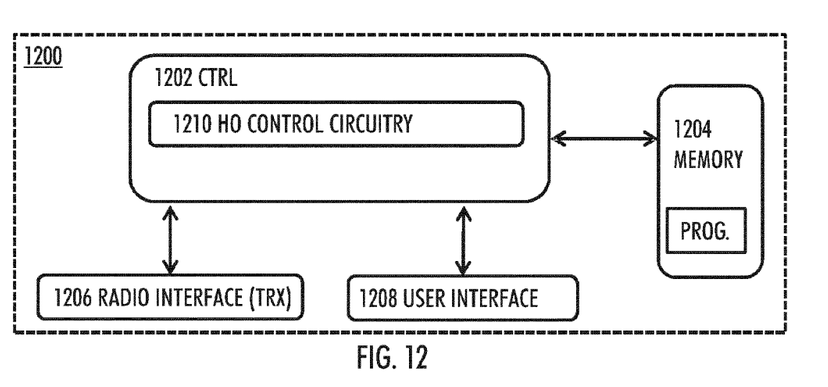

FIGS. 10 to 12 provide apparatuses 1000, 1100, and 1200 com-prising a control circuitry (CTRL) 1002, 1102, 1202, such as at least one processor, and at least one memory 1004, 1104, 1204 including a computer pro-gram code (PROG), wherein the at least one memory and the computer pro-gram code (PROG), are configured, with the at least one processor, to cause the respective apparatus 1000, 1100, 1200 to carry out any one of the embodiments described. It should be noted that FIGS. 10, 11, and 12 show only the elements and functional entities required for understanding a processing systems of the apparatuses. Other components have been omitted for reasons of simplicity. It is apparent to a person skilled in the art that the apparatuses may also comprise other functions and structures.

Each of the apparatuses 1000, 1100, 1200 may, as said, comprise a control circuitry 1002, 1102, 1202, respectively, e.g. a chip, a processor, a micro controller, or a combination of such circuitries causing the respective apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each of the control circuitries may comprise an interface, such as computer port, for providing communication capabilities. The respective memory 1004, 1104, 1204 may store software (PROG) executable by the corresponding at least one control circuitry The apparatuses 1000, 1100, 1200 may further comprise radio interface components (TRX) 1006, 1106, 1206 providing the apparatus with radio communication capabilities with the radio access network. The radio inter-face components may comprise standard well-known components such as amplifier, filter, frequency-converter, (de)modulator, and encoder/decoder circuitries and one or more antennas.

The apparatuses 1000, 1100, 1200 may also comprise user inter-faces 1008, 1108, 1208 comprising, for example, at least one keypad, a micro-phone, a touch display, a display, a speaker, etc. Each user interface may be used to control the respective apparatus by the user.

As said, the apparatuses 1000, 1100, 1200 may comprise the memories 1004, 1104, 1204 connected to the respective control circuitry 1002, 1102, 1202. However, memory may also be integrated to the respective control circuitry and, thus, no memory may be required. The memory may be implemented using any suitable data storage technology, such as semiconductor based memory devices, flash memory, magnetic memory devices and systems, optical memory devices and systems, fixed memory and removable memory.

In an embodiment, the apparatus 1000 may be or be comprised in a base station (also called a base transceiver station, a Node B, a radio network controller, or an evolved Node B, for example). In an embodiment, the apparatus 1200 is or is comprised in the network node 104 of the source cell 106.

The control circuitry 1002 may comprise a group HO control circuitry 1010 for performing the functionalities related to the group HO, according to any of the embodiments. A grouping circuitry 1012 may be, e.g., for determining the common attribute(s) and/or attribute value(s) among the UEs and for forming at least one group based on the determination.

In an embodiment, the apparatus 1100 may be or be comprised in a base station (also called a base transceiver station, a Node B, a radio network controller, or an evolved Node B, for example). In an embodiment, the apparatus 1200 is or is comprised in the network node 100 of the target cell 102.

The control circuitry 1102 may comprise a group HO control circuitry 1110 for performing the functionalities related to the group HO, according to any of the embodiments. The control circuitry 1102 may further comprise a radio resource management (RRM) circuitry 1112 for allocating resources for the subset, for the group and/or for individual UEs which are to be handed over to the target cell. The circuitry 1112 may also contribute in determining whether or not the handover of a plurality of UEs is possible on the basis of available resources.

In an embodiment, the apparatus 1200 may comprise the terminal device of a cellular communication system, e.g. a computer (PC), a laptop, a tabloid computer, a cellular phone, a communicator, a smart phone, a palm computer, or any other communication apparatus. Alternatively, the apparatus 1200 is comprised in such a terminal device. Further, the apparatus 1200 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 1200 may be, comprise or be comprised in a user terminal in a group which is to be handed over from the source cell to the target cell, such as the UE 114, for example.

The control circuitry 1202 may comprise a HO control circuitry 1210 for performing the functionalities related to the (group) HO, according to any of the embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   acquiring, by a network node of a source cell, information that a handover of a plurality of user terminals currently connected to the source cell is needed to a target cell;
   determining at least one attribute with respect to each of the plurality of user terminals;
   selecting at least some of the plurality of user terminals to form a group of user terminals such that the user terminals in the group share at least one common attribute; and
   indicating the at least one common attribute of the group to a target node of the target cell in a group handover request message, wherein:
   a specific part of the handover process is performed with only a subset of the group,
   the subset represents the whole group in the specific part of the handover preparation,
   at least one parameter value related to the common attribute in the specific part of the handover process is determined and is to be applied in communication between the target cell and the subset, and
   the determined at least one parameter is considered as valid also for the rest of the user terminals in the group.

2. The method of claim 1, further comprising:
   during the transfer of the context of the individual user terminals in the group to the target node, bypassing the retransmission of the at least one common attribute to the target node.

3. The method of claim 1, wherein the at least one common attribute defines that the user terminals in the group have at least one of the following: the same priority according to a predetermined criteria, quality-of-service requirements of a predefined similarity, resource block configurations of a predefined similarity, and timing advances within a predefined interval.

4. The method of claim 1, further comprising:
   receiving an indication of a temporary identification corresponding to one of the user terminals in the group from the target node; and
   deriving the temporary identifications for the rest of the user terminals in the group on the basis of the indicated temporary identification.

5. The method of claim 1, further comprising:
receiving an indication of allocated resources from the target node, wherein the resources are allocated to only the subset of the group; and
distributing the allocated resources to the subset, wherein the allocated resources are to be used by the subset in representing the whole group during the specific part of the handover process.

6. The method of claim 1, wherein the source cell is a cell at least partly controlled by an authorized cell access, ASA, procedure.

7. A method comprising:
receiving, by a network node of a target cell, a group handover request message from a source node of a source cell, wherein the request message comprises an indication of at least one common attribute shared by a plurality of user terminals in a group which is to be handed over to the target cell;
considering the received at least one common attribute as valid for each of the user terminals in the group;
during the transfer of the context of the individual user terminals in the group from the source node as part of a handover process, bypassing the re-reception of the at least one common attribute from the source node;
performing a specific part of handover process with only a subset of the group, wherein the subset represents the whole group in the specific part of handover preparation;
determining at least one parameter value related to the common attribute in the specific part of the handover process, wherein the at least one parameter value is to be applied in communication between the target cell and the subset; and
considering the determined at least one parameter as valid also for the rest of the user terminals in the group.

8. The method of claim 7, further comprising:
determining to accept the group handover; and
causing a transmission of group handover response message to the source node, wherein the response message comprises group specific control information to be distributed by the source node to the user terminals in the group.

9. The method of claim 7, wherein the at least one common attribute defines that the user terminals in the group have at least one of the following: the same priority according to a predetermined criteria, quality-of-service requirements of a predefined similarity, resource block configurations of a predefined similarity, and timing advances within a predefined interval.

10. The method of claim 7, further comprising:
allocating resources to the subset of the group, wherein the allocated resources are to be used by the subset in representing the whole group during the specific part of the handover process; and
indicating the allocated resources to the source node for distribution to the subset.

11. The method of claim 7, further comprising:
scheduling an uplink grant to the user terminals in the group which have not performed the specific part of the handover process; and
upon receiving a transmission of information from a user terminal that received the scheduled uplink grant, considering the handover for that certain user terminal as successful.

12. The method of claim 7, further comprising:
upon detecting that according to the at least one common attribute the user terminals in the group have timing advances with respect to the source cell within a predefined interval, determining a timing advance with respect to the target cell for the subset in the specific part of the handover process; and
considering the determined timing advance as valid also for the rest of the user terminals in the group.

13. The method of claim 7, further comprising:
assigning a temporary identification to each of the user terminals in the group on the basis of a predetermined rule; and
indicating one of the assigned temporary identifications corresponding to one of the user terminals to the source node in order to enable the source node to derive the temporary identifications for the rest of the user terminals in the group on the basis of the indicated temporary identification.

14. The method of claim 7, further comprising:
detecting that there are different priorities among the user terminals that are to be handed over to the target cell;
detecting that all of the user terminals cannot be handed over to the target cell; and
deciding to handover only those user terminals which have a higher priority than a predetermined threshold.

15. The method of claim 7, further comprising:
upon successfully performing the group handover, causing a transmission a group specific message indicating that the source node is to release the contexts of all the user terminals in the group.

16. A method comprising:
receiving, by a user terminal comprised in a group which is to be handed over from a source cell to a target cell, an indication of a timing advance which is to be applied in a communication with the target cell; and
detecting that a specific part of the handover process related to acquiring the timing advance is to be bypassed, wherein
at least one common attribute is shared by a plurality of user terminals in the group,
the at least one common attribute is indicated to the target cell in a group handover request message,
the specific part of handover process is performed with only a subset of the group,
the subset represents the whole group in the specific part of handover preparation,
the timing advance is to be applied in communication between the target cell and the subset, and
the timing advance is considered as valid also for the rest of the user terminals in the group.

17. An apparatus comprising:
at least one processor; and
at least one memory including a computer program code, wherein the at least one memory and the computer program code are configured, with the at least one processor, to cause the apparatus at least to:
acquire information that a handover of a plurality user terminals currently connected to a source cell is needed to a target cell;
determine at least one attribute with respect to each of the plurality of user terminals;
select at least some of the plurality of user terminals to form a group of user terminals such that the user terminals in the group share at least one common attribute; and
indicate the at least one common attribute of the group to a target node of the target cell in a group handover request message, wherein
a specific part of the handover process is performed with only a subset of the group, the subset represents the whole group in the specific part of the handover preparation, at least one parameter value related to the common attribute in the specific part of the handover process is determined and is to be applied in communication between the target cell and the subset, and the determined at least one parameter is considered as valid also for the rest of the user terminals in the group.

18. The apparatus of claim 17, wherein the at least one memory and the computer program code are configured, with the at least one processor, to cause the apparatus further to:

during the transfer of the context of the individual user terminals in the group to the target node, bypass the retransmission of the at least one common attribute to the target node.

19. The apparatus of claim 17, wherein the at least one memory and the computer program code are configured, with the at least one processor, to cause the apparatus further to:

receive an indication of a temporary identification corresponding to one of the user terminals in the group from the target node; and derive the temporary identifications for the rest of the user terminals in the group on the basis of the indicated temporary identification.

\* \* \* \* \*